United States Patent [19]
Hehr

[11] Patent Number: 5,244,193
[45] Date of Patent: Sep. 14, 1993

[54] T-SLOT BOLT SLEEVE

[76] Inventor: Kenneth L. Hehr, 4089 S. Spring Dr., Ferndale, Wash. 98248

[21] Appl. No.: 926,904

[22] Filed: Aug. 7, 1992

[51] Int. Cl.$^5$ .............................................. B23Q 3/02
[52] U.S. Cl. ...................................... 269/99; 411/84; 411/104
[58] Field of Search ...................... 269/99, 100, 91–94, 269/900; 4/252.4, 252.5, 252.6; 411/84, 85, 104

[56] References Cited

U.S. PATENT DOCUMENTS

| | | | |
|---|---|---|---|
| 225,563 | 3/1880 | Canedy | 269/100 |
| 2,372,716 | 4/1945 | Evans | 269/100 |
| 2,620,704 | 12/1952 | Evans | 269/100 |
| 4,183,387 | 1/1980 | Lenz . | |
| 4,261,558 | 4/1981 | Carossino | 269/91 |
| 4,445,678 | 5/1984 | George | 269/99 |
| 4,957,402 | 9/1990 | Klein et al. | 411/84 |
| 5,104,270 | 4/1992 | Ritzl | 411/104 |

OTHER PUBLICATIONS

Adap-T-Bolt Kits Brochure; Kurt Manufacturing Company, Inc., Minneapolis, Minn.
"Formed Adapter Converts Standard Head Bolt Into T-Bolt", *Design News*, Feb. 26, 1982, Published by Garners Publishing Co.

*Primary Examiner*—Robert C. Watson
*Attorney, Agent, or Firm*—Hughes & Multer

[57] ABSTRACT

A T-slot bolt sleeve for retaining the head of a conventional bolt in the T-slot of a machine tool table. The sleeve has a lower base block portion which slides in the main portion of the T-slot, and a neck portion which extends upwardly from this so as to ride in the relatively narrow entrance slot. There is a recess in the bottom of the base block for receiving the head of the bolt, and the shank of the bolt passes through a bore which extends upwardly from this. This holds the bolt in an inverted position so that the threaded end extends upwardly from the table for attachment of a nut or other fitting. The bottom of the base block is provided with a planar bearing surface which supports the assembly against side-to-side rocking as this is slid through the T-slot. The invention permits ordinary bolts of various lengths to be used in place of conventional T-nuts or T-bolts.

7 Claims, 3 Drawing Sheets

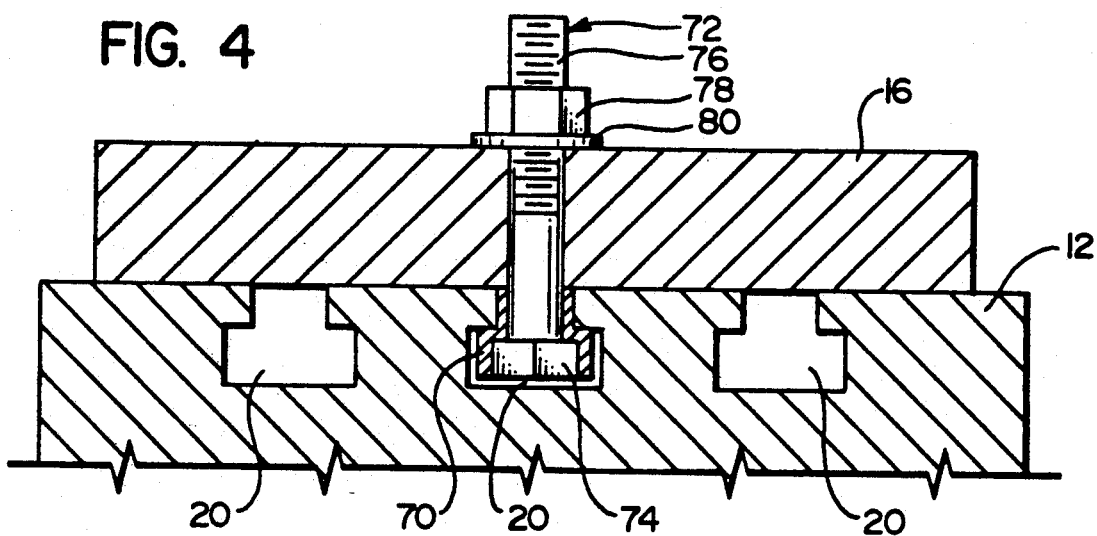
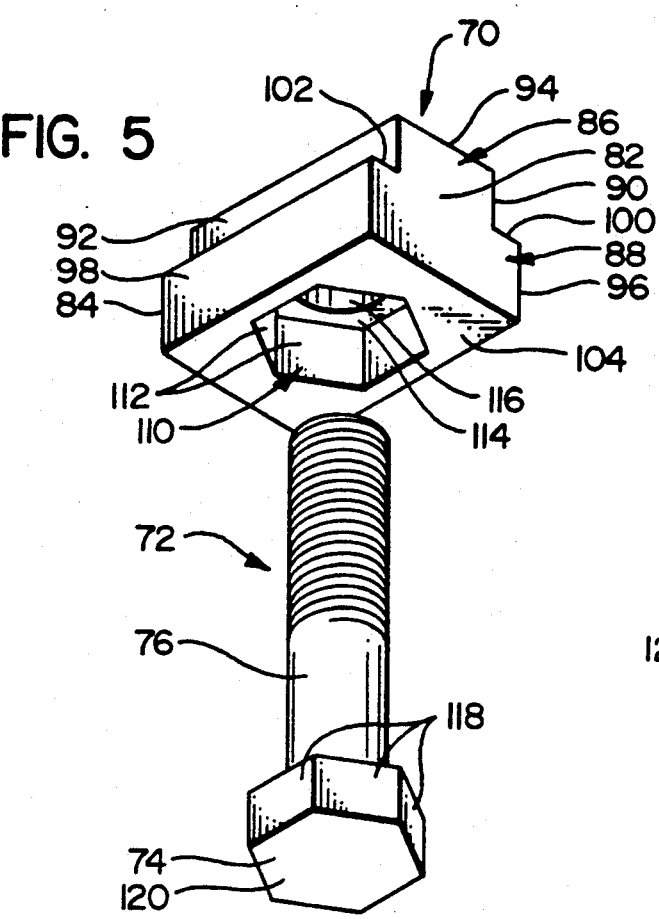
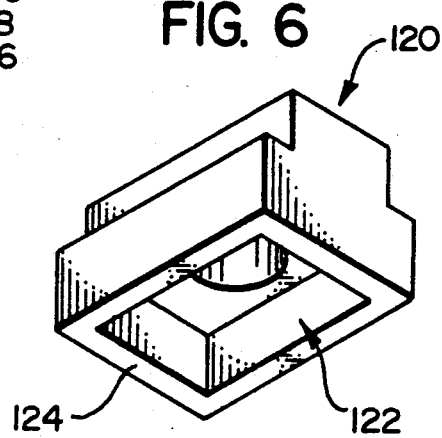

T-SLOT BOLT SLEEVE

FIELD OF THE INVENTION

The present invention relates generally to machine tools and accessories, and, more particularly, to a sleeve adaptor which permits standard bolts to be used to engage the T-slots of machine tool tables or beds.

BACKGROUND ART

Machine tools are conventionally provided with a table or bed to which the workpiece is mounted so that a machine operation can be performed on this. The workpiece is normally held down by some form of bolt arrangement, and a common approach is to provide the table or bed with T-slots, as may be seen in FIG. 1. This shows a conventional machine tool 10 having a table 12. The table is mounted on rails 14 for adjustment inwardly and outwardly from the tool. The workpiece 16 is mounted to the table by studs or bolts 18, and the lower ends of these are received in parallel T-slots 20; these extend across table 12 so as to permit adjustment of the position of the workpiece in a direction perpendicular to the rails 14.

As can be seen in FIG. 2, each of the T-slots 20 is made up of a relatively narrow entrance portion 22 at the upper surface of table 12, this being bordered by sidewalls 24, 26, and a wider main portion 30 beneath this, this latter being made up of parallel sidewalls 32, 34 and a bottom wall 36. The lower ends of bolts 18 extend into the T-slots, and it has previously been standard practice to thread these into T-nuts which ride in the slots. These T-nuts have an exterior configuration which conforms generally to that of slots 20, in that there is a relatively narrower upper portion which rides within the entrance slot 22, and a larger diameter lower portion which fits within the main slot portion 30 so as to prevent the nut from being pulled out of the slot. Thus, when the bolt is slackened, the workpiece can be slid back and forth as the T-nut moves longitudinally within the T-slot; then, when the desired position has been reached, the bolt is tightened, drawing the T-nut up against the shoulders 28 of the slots and forcing the workpiece 16 into frictional engagement with table 12.

This conventional arrangement has been in use for many decades, but, despite this, it continues to exhibit several wearisome disadvantages. Perhaps the most serious of these is that the use of T-nuts often leads to a "false clamping" situation: as the upper nuts are repeatedly tightened and loosened, the studs tend to back out of the T-nut until only one or two threads are engaged; this gives the operator the impression that the workpiece is properly secured when the upper nuts are tightened, but the threads may subsequently strip out under machining pressure so that the workpiece suddenly comes loose as the machining operation is in progress. Also, T-nut threads are frequently damaged or become worn, as from cross-threading or material falling into the threads, and this necessitates frequent replacement of the nuts. Furthermore, the bolt (or stud) is usually tightened with a wrench, and as this is done, it will frequently extend through the bottom of the T-nut and damage the bottom wall of the T-slot; this damage tends to accumulate over a period of time, to the extent that the table may eventually become ruined.

Attempts have been made to overcome this latter problem by providing a T-nut with a closed lower end, but the end of the bolt tends to jam into this as it is tightened, ruining the nut and bolt; this problem is so frequently encountered that factories having large machine shop operations have been known to go through thousands of T-nuts every year. Another approach which has been tried is to provide a T-bolt unit, the head of which is received in the T-slot so that a stud extends upwardly from this. Although this obviates the possibility of damaging the slot, many different lengths of T-bolts must be purchased to outfit a single machine tool, and this is both expensive and cumbersome in practice. Also, the threads of the T-bolts are frequently damaged or become worn in use, and then the entire T-bolt must be replaced, which can be quite expensive over time.

There has also been an attempt to avoid these problems entirely by using standard bolts with an adaptor attachment which permits these to engage the T-slots, as is disclosed in U.S. Pat. No. 4,183,387. FIGS. 2-3 illustrate this prior art device, and these show the standard bolt 38 and the adaptor fitting 40 which is mounted to this. As can be seen, the bolt 38, in conventional fashion, is made up generally of an elongate threaded shank portion 42 and a square head portion 44 having flats 46. The adaptor fitting 40, in turn, is made up generally of a flat main plate portion 48 having a central bore 50 through which the shank of the bolt passes, and ear portions which are bent upwardly and downwardly from this; the ear portions 52, 54 along the longitudinal edges of plate portion 48 are downwardly extending, while the ear portions 56, 58 at the ends of the plate are upwardly extending. As is shown in FIG. 2, the upwardly extending ear portions are configured to ride within the entrance slot portion of the T-slot, while the downwardly extending ears ride against the sidewalls of the main slot portion to prevent rotation of the device, and position the upper surface of plate 48 so that this abuts the shoulder 28 of the T-slot when nut 60 is tightened on the end of the bolt.

This arrangement is advantageous in that it permits the use of standard square-headed bolts to mount the workpiece to the table. These bolts are very inexpensive to purchase and replace when worn, and it would be very convenient and inexpensive to provide a supply of these of various lengths for use with a small numer of adaptors, rather than having to purchase many individual T-bolts of various lengths. Unfortunately, this prior art adaptor fitting has been found to exhibit inherent deficiencies which have rendered it generally unacceptable to the trade. Firstly, the plate-like adaptor fitting (which is normally manufactured by cold working of a flat metal plate) simply possesses insufficient strength for this to have an adequate working life; with repeated tightening of the bolt, the adaptor fitting tends to become permanently deformed and must be replaced. Another disadvantage inherent in this construction is that for use with large T-slots the plate material must be relatively thick, and it is impractical to bend the corners of this with a sufficiently small radius that adequate load-bearing surfaces will be provided; for example, a typical large T-slot may have an entrance slot 1½" wide and a main slot 2½" inches wide, and would require a ¼" thick plate for use with a 1¼" hold-down bolt, which material simply can't be bent around sufficiently small radii to render this feasible. Also, because of its configuration, the device can only engage two of the flats on the bolt head with the depending ears, which tends to result excessive wear on the ears and less than positive engagement of the bolt. Furthermore, while the fitting successfully prevents the bolt from rotating and being pulled out of the T-slot when the nut is tightened, it otherwise provides virtually no support to prevent the assembly from tipping or rocking back and forth in the slot; thus, when the nut is slackened, the bolt head and adaptor fitting simply fall downwardly into the slot, and these easily become cockeyed and jammed in the slot when the operator attempts to adjust the position of the workpiece. The consequent inability of this assembly to slide back and forth smoothly represents a source of frustration and wasted time for the operator.

Accordingly, there exists a need for an adaptor which will permit a conventional bolt to be mounted within a T-slot so that this can be used as a hold-down for a workpiece on a machine tool table, yet which is configured so as to have adequate resistance to deformation that this will have an acceptable service life. Furthermore, there is a need for such an adaptor which is configured so that this will support the head of the bolt such that this can be slid back and forth within the T-slot without fear that the assembly will become cockeyed and stuck in the slot.

SUMMARY OF THE INVENTION

The present invention has solved the problems cited above, and this is a sleeve for retaining a head of a bolt in a T-slot. Broadly, this comprises a base block which is sized to be received in the main portion of the T-slot so as to permit sliding movement therein, but so as to prevent withdrawal of the base block upwardly through the narrower entrance portion of the slot. The base block has first and second sidewall portions which are configured to be positioned closely adjacent sidewall portions of the main slot so as to prevent rotation of the base block therein. There is a recess in an underside of the base block, and this is configured to receive and engage the head of the bolt so as to prevent rotation of the bolt therein. A bore extends from the recess upwardly through the base block, and this is configured to permit the shank of the bolt to extend therethrough and upwardly from the base block through the entrance portion of the T-slot. The bottom of the base block is provided with a planar bearing face which extends the length and width of the base block, this being configured to slidingly rest on a bottom wall of the T-slot so as to support the block and bolt against side-to-side tipping in the slot.

Preferably, the sleeve may further comprise an upper neck portion which extends upwardly from the base block so as to fit within the entrance portion of the T-slot. The bore extends upwardly through the neck portion, so that this is provided with increased wall length for supporting the shank of the bolt. Also, the upper neck portion may have first and second longitudinally-extending sidewall surfaces which are configured to be positioned closely adjacent sidewall surfaces of the entrance slot, so as to both prevent rotation of the sleeve in the T-slot, and provide the sleeve and the bolt with additional support against rocking in a direction transverse to the T-slot.

The neck portion of the sleeve may extend upwardly from a central portion of an upper surface of the base block, so that portions of this upper surface extend on either side of the neck portion so as to form planar shoulder portions; these are configured to abut an upper surface of the main slot in load-bearing engagement therewith.

The planar bearing face on the underside of the base block may be configured as an elongate rectangular surface having the recess located centrally therein. The recess itself may be hexagonally shaped for receiving hexagonal bolt heads, or may be rectangularly shaped for interchangeably receiving both square and hexagonal bolt heads.

Objects and advantages of the invention not clear from the above will be understood by a reading of the detailed description of the invention and a review of the accompanying drawings.

BRIEF DESCRIPTION OF THE DRAWINGS

FIG. 4 is a cross-sectional view similar to FIG. 2, this showing the head of a conventional bolt being retained in the T-slot by the bolt sleeve of the present invention;

FIG. 5 is an underside perspective view of the bolt and sleeve of FIG. 4; and

FIG. 6 is a perspective view of a second embodiment of the bolt sleeve of the present invention, this differing from that shown in FIG. 5 in having a rectangular vice hexagonal recess for receiving the head of a bolt.

DETAILED DESCRIPTION

Figure 1:
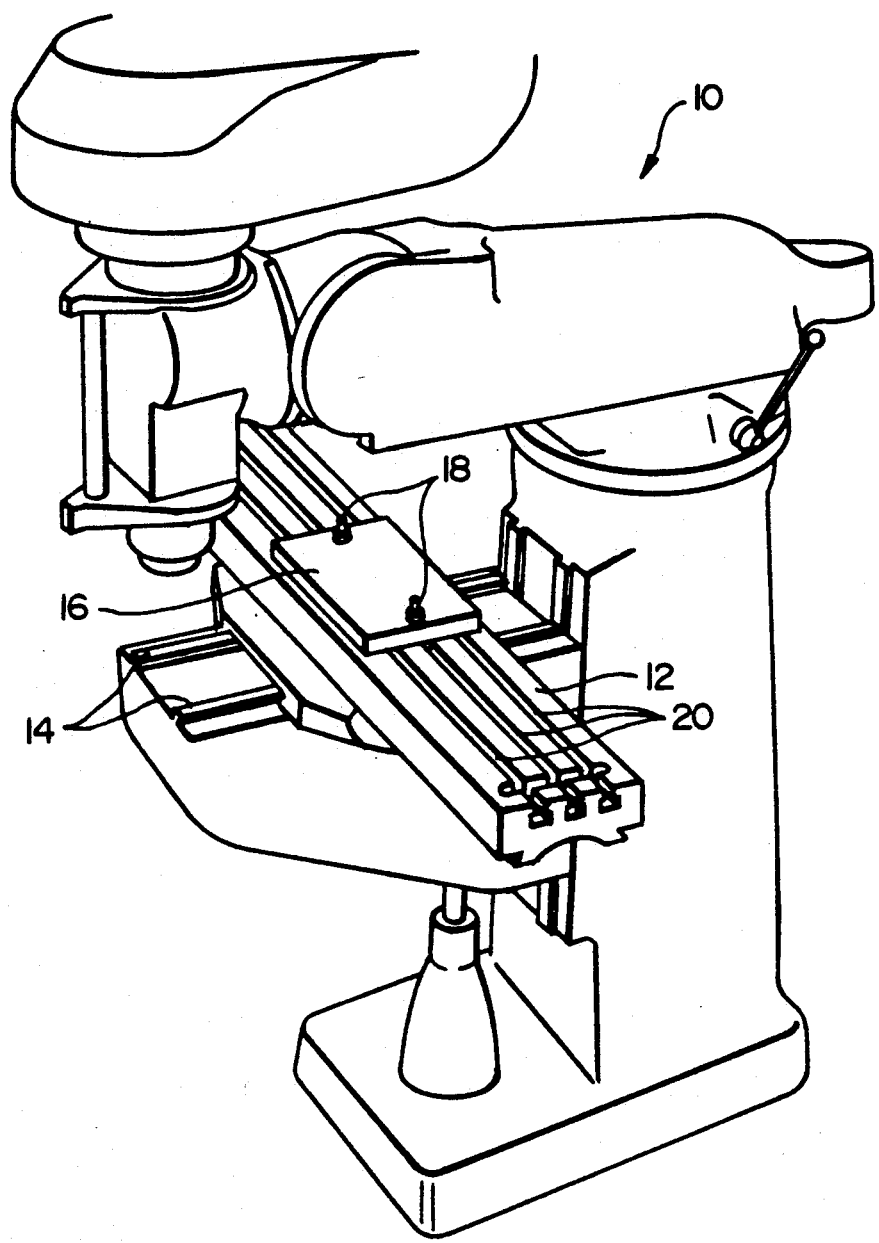
FIG. 1 is a perspective view of a machine tool having a table which is provided with T-slots in a conventional manner, there being a workpiece mounted to this table by bolts which extend into the T-slots.
Figure 3:
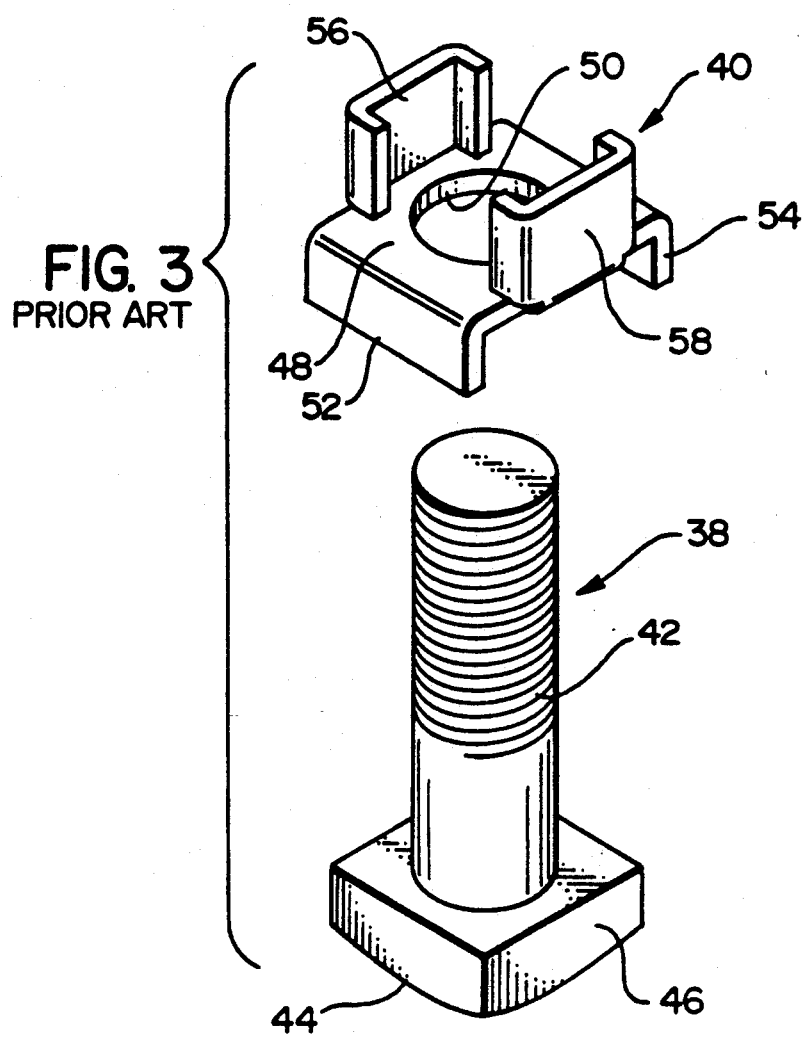
FIG. 3 is a perspective view of the bolt and prior art adaptor fitting of FIG. 2.
Figure 2:
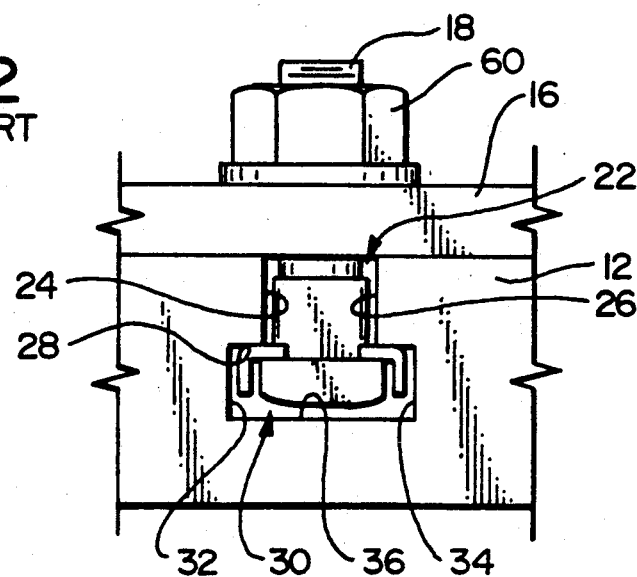
FIG. 2 is a cross-sectional view of the table and workpiece shown in FIG. 1, showing the head of a conventional bolt being retained in the T-slot by the prior art adaptor fitting described above.

In general terms, the present invention is a T-slot bolt sleeve 70 which accepts off-the-shelf hex-head or square-head bolts of specific head sizes and various lengths. As is shown in FIG. 4, the bolt sleeve 70 engages the conventional T-slots 20 of a machine tool table 12 so as to retain the head of the bolt 74 in this slot. The shank 76 of the bolt extends upwardly from this to the workpiece 16, and a nut 78 engages the threaded upper end of the bolt. When this is tightened, the force bears through a washer 80 against the upper side of workpiece 16 and forces this into frictional engagement with the table, in the manner previously described.

FIG. 5 shows the sleeve 70 and associated bolt 72 in greater detail. As can be seen, the sleeve 70 is generally "T"-shaped in transverse cross section, so that this corresponds to the cross-sectional configuration of the T-slots 20 so as to be interchangeably receivable therein. The sleeve is a generally solid body, and this may be, for example, machined from steel or manufactured from forged, cast or powdered metal or other appropriate material. The body of the sleeve has first and second end faces 82, 84, these generally having a shape of an inverted "T". The upper leg of the "T" forms a relatively narrow neck portion 86 which is sized to fit within the entrance slot portion of the T-slots, while the lower part of the member extends laterally outwardly to form a wider, base block or chock portion 88 which fits within the main portion of the slot. Thus, the upper neck portion of the T-bolt sleeve has first and second longitudinally extending sidewalls 90, 92 which slidingly engage the sidewalls 24, 26 of the entrance slot, and a flat top face 94. The lower base block portion 88, in turn, has first and second longitudinally extending sidewalls 96, 98 which conform to the vertical sidewalls 34, 32 of the main portion of the T-slot, and where these lower sidewalls are spaced outwardly from the upper neck portion of the sleeve, the upper surface of the base block forms horizontally extending shoulder areas 100, 102; these are configured to abut corresponding shoulder portions 28 when the nut 78 is tightened, so as to retain the sleeve 70 and the bolt head in the T-slot.

The lower surface of bolt sleeve 70 is formed by a planar bearing face 104. The base block 88 is preferably longer than it is wide, so that lower bearing face 104 will be configured generally as an elongate rectangle. As will be described below, this enables the bearing face to provide the sleeve and bolt with greater stabilizing support as the assembly is slid along the T-slot.

A central recess 110 is formed in and extends upwardly from lower bearing face 104 for a finite distance. In the embodiment which is illustrated, this recess is hexagonal, and so is bordered with six inner faces 112. The upper end of recess 110 is formed by an end wall 114, and this is pierced by a central bore 116 which extends upwardly through the body of the device to the top wall 94; the bore extends through the upper neck portion of the sleeve, and the height of this provides the bore with additional wall length and thus enhances the lateral support which is offered thereby. The bore 116 is unthreaded, and is sized so that the shank 76 of bolt 72 slides freely through this. As this is done, the head 74 of the bolt is received in recess 110, so that the flats 118 on this are positioned adjacent the inner faces of the recess. The recess is sized to have a depth which is at least equal to that of bolt head 74, and is preferably slightly deeper than this so that the end face 120 of the bolt head is recessed upwardly from bearing face 104 when the bolt is tightened. This ensures that bearing face 10 is unencumbered by the bolt head protruding downwardly from the recess, and so ensures that the assembly slides easily within the T-slot; this also compensates for slight variations in the thickness of the bolt head which might be encountered with bolts from different manufacturers, or due to manufacturing variances.

At this point, it should be noted that the recess 110 is hexagonal in the embodiment which is illustrated, so that this is configured for use with hex-head bolts. If, however, it is intended to use square- or rectangular-headed bolts with the sleeve, the recess may be configured to be correspondingly square or rectangular in shape; also, a square or rectangular recess may permit both square- and hexagonal-headed bolts to be used interchangeably with the same sleeve member.

Having described the structure of the adaptor sleeve of the present invention, the manner in which this is used will now be described in greater detail. As a first step, the operator selects a bolt 76 of the appropriate length for a particular application; in other words, the operator may select the bolt to have sufficient length than its threaded end extends above the upper surface of the workpiece. The operator then slips the sleeve over the bolt so that shank 76 passes through bore 116, until the head 74 of the bolt is received in recess 110 and buts up against end wall 114. The operator then slips the assembly into a selected T-slot and slides this longitudinally through the slot until the desired position is reached. As this is done, bearing face 104 engages the bottom wall 36 of the T-slot and slides along this, providing the assembly with support and preventing tipping back and forth; by virtue of the fact that the bearing face is elongated in the direction which the assembly is moved through the slot, this provides for better stabilization against the tipping moment which is caused by the operator pressing sideways against the upwardly protruding end of the bolt. This stabilization is augmented by the elongate shoulders 100, 102 on the sleeve, which slide beneath the shoulders 28 of the slot; because of the elongate configuration of bearing face 104 and these shoulders, this tipping motion will only progress through a very small arc before it is arrested by abutment of the shoulders on the sleeve and those on the slot. As for tipping in a transverse direction (i.e., across the direction of the slots), this is similarly limited by the shoulders, and also by the abutment of the sidewalls of the neck portion of the sleeve and those of the narrow entrance portion of the slot. Thus, the assembly slides very smoothly back and forth through the T-slots, and there is very little tipping or rocking of the assembly in any direction as this is done.

When the desired position has been reached, the threaded shank of the bolt is passed through or otherwise attached to the workpiece, and then the nut 78 is threaded onto the end of this and tightened to force the workpiece against table 12. While the nut is being tightened, the engagement of the flats 118 on the bolt head with the inner faces 112 of the recess prevent the head of the bolt from being turned in the recess by the torque which is transmitted through shank 76. As this is done, the lower face 104 of the T-slot bolt sleeve is pulled away from the bottom wall of the slot by the upward movement of the bolt head, until the shoulders 100, 102 come into load-bearing abutment with the shoulders 28 of the T-slot; the upwardly extending neck portion of the sleeve is sized so that this has a height less than the depth of the entrance slot 22, so as to avoid top wall 94 coming into contact with the underside of the workpiece before the shoulders come into abutment and take up the load. Further tightening of the nut then forces the workpiece into firm frictional engagement with the table so as to lock this in place.

As noted above, the T-slot bolt sleeve is subjected to significant stress when the nut is tightened on bolt 72. However, because of the structure of the present invention, this is much more able to bear these loads without experiencing damaging deformation. Firstly, the monolithic structure of the present invention is provided with a much greater mass of material with which to bear these loads than the bent-plate structure of the prior art device described above. Furthermore, because of this solid structure, the various longitudinally extending sidewalls (i.e, lower sidewalls 96, 98 and upper sidewalls 90, 92) are interconnected by the transversely extending material of the end face portions of the device, so that these are supported by the compressive strength of this material against inward flexing when loaded. Still further, the increased longitudinal extent of the shoulder portions 100, 102 provide for an increased load-bearing area, and because the monolithic structure lends itself to fabrication by machine, casting, forging, etc., these faces may be formed much more true and square-edged, so as to have enhanced load-bearing areas and capabilities by comparison to the round-shouldered bent-plate structure of the prior art device. Also, because the lower recess is fully surrounded by the material of the sleeve, this also has enhanced load-bearing and wear characteristics, and can be configured to engage all of the flats of the bolt head if so desired, not just two of these. Accordingly, the present invention is provided with significant advantages over previously known devices in terms of both ease of operation and extended service life.

An exemplary embodiment of the T-slot bolt sleeve having a configuration of FIG. 5 is provided with the following dimensions:

| | |
|---|---|
| Overall Length | 1.60" |
| Overall Height | .90" |
| Width of Lower Block Portion | 1.25" |
| Height of Lower Block Portion | .56" |
| Width of Upper Neck Portion | .79" |
| Height of Upper Neck Portion | .34" |
| Width of Hexagonal Recess | .95" |
| Depth of Recess | .45" |
| Diameter of Bore | .635" |
| Chamfer at base of Bore | .0625" × 45° |

The embodiment having these exemplary dimensions has been found eminently suitable for use with standard ⅝" hex-head bolts (e.g., cap screws), which are readily available from many suppliers, including hardware stores and other wholesale and retail sources. Of course, the sleeve of the present invention may be provided with whatever specific configuration and dimensions are suitable for a particular size or type of bolt or T-slot; for example, as noted above, it may be desired to use the sleeve interchangeably with both hex- and square-headed bolts, and it has been found that a rectangular recess 15/16 " wide × 1 ⅛" long is suitable for use with a wide range of ⅝" bolt, having both hexagonal and square heads.

An example of this appears in FIG. 6, which shows a second bolt sleeve 120 having a rectangular recess 122 formed in its lower bearing face 124; on others respects, this sleeve is substantially identical to that described above. The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A sleeve for retaining a head of a bolt in a T-slot having a relatively wide lower main slot and a relatively narrower upper entrance slot, said sleeve comprising:

a base block sized to be received in said main slot so as to permit sliding movement therein, but to prevent withdrawal of said base block upwardly through said entrance slot;

said base block having first and second sidewall portions which are configured to be positioned closely adjacent sidewall portions of said main slot so as to prevent rotation of said base block therein;

a recess in an underside of said base block, said recess being configured to receive said head of said bolt so as to prevent rotation of said bolt therein;

a bore extending from said recess upwardly through said base block, said bore being configured to permit a shank of said bolt to extend therethrough and upwardly from said base block through said entrance slot; and a planar bearing face extending the length and width of said underside of said base block, said bearing face being configured to slidingly rest on a bottom wall of said T-slot so as to support said block and a said bolt which is received therein against side-to-side tipping in said T-slot.

2. The sleeve of claim 1, further comprising an upper neck portion which extends upwardly from said base block so as to fit within said entrance slot, said bore extending upwardly through said neck portion so as to provide said bore with increased wall length for supporting said shank of said bolt.

3. The sleeve of claim 2, wherein said upper neck portion has first and second longitudinally-extending sidewall surfaces which are configured to be positioned closely adjacent sidewall surfaces of said entrance slot, so as to prevent rotation of said sleeve in said T-slot and provide said sleeve and said bolt with additional support against rocking in a direction transverse to said T-slot.

4. The sleeve of claim 3, wherein said upper neck portion extends upwardly from a central portion of an upper surface of said base block, and portions of said upper surface extend on either side of said neck portion so as to form planar shoulder portions which are configured to abut an upper surface of said main slot in load-bearing engagement therewith.

5. The sleeve of claim 4, wherein said planar bearing face on said underside of said base block is configured as an elongate rectangular surface having said recess located centrally therein.

6. The sleeve of claim 5, wherein said recess is hexagonally shaped for receiving hexagonal bolt heads.

7. The sleeve of claim 5, wherein said recess is rectangularly shaped for interchangeably receiving square and hexagonal bolt heads.

* * * * *